(12) United States Patent
Cha

(10) Patent No.: US 12,276,719 B2
(45) Date of Patent: Apr. 15, 2025

(54) RADAR DEVICE AND SIGNAL PROCESSING METHOD OF RADAR DEVICE

(71) Applicants: DENSO CORPORATION, Kairya (JP); MIRISE Technologies Corporation, Nisshin (JP); TOYOTA MOTOR CORPORATION, Toyata (JP)

(72) Inventor: Sungwoo Cha, San Jose, CA (US)

(73) Assignees: DENSO CORPORATION, Kariya (JP); MIRISE Technologies Corporation, Nisshin (JP); TOYOTA MOTOR CORPORATION, Toyota (JP)

( * ) Notice: Subject to any disclaimer, the term of this patent is extended or adjusted under 35 U.S.C. 154(b) by 502 days.

(21) Appl. No.: 17/693,772

(22) Filed: Mar. 14, 2022

(65) Prior Publication Data

US 2022/0317277 A1    Oct. 6, 2022

Related U.S. Application Data

(60) Provisional application No. 63/168,510, filed on Mar. 31, 2021.

(51) Int. Cl.
*G01S 13/58* (2006.01)
*G01S 7/35* (2006.01)

(52) U.S. Cl.
CPC ............ *G01S 13/584* (2013.01); *G01S 7/356* (2021.05)

(58) Field of Classification Search
CPC .......... G01S 7/356; G01S 7/023; G01S 7/354; G01S 13/931; G01S 13/343; G01S 13/345; G01S 13/584

USPC ................................ 342/104, 107, 455, 147
See application file for complete search history.

(56) References Cited

U.S. PATENT DOCUMENTS

| | | | | |
|---|---|---|---|---|
| 7,439,903 B2 * | 10/2008 | Watanabe | ............. | G01S 7/0235 342/159 |
| 7,755,534 B2 * | 7/2010 | Samukawa | ........... | G01S 13/345 342/438 |
| 9,513,369 B2 * | 12/2016 | Minowa | ................ | G01S 13/581 |
| 11,035,932 B2 * | 6/2021 | Matsumoto | ........... | G01S 13/343 |

(Continued)

FOREIGN PATENT DOCUMENTS

CN        102680963 A       9/2012

*Primary Examiner* — Vladimir Magloire
*Assistant Examiner* — Michael W Justice
(74) *Attorney, Agent, or Firm* — Harness, Dickey & Pierce, P.L.C.

(57) ABSTRACT

A radar device includes a transmitter module configured to generate transmission waves including: generating a first chirp chain at a first chirp rate for a transmission wave to be output including: generating a first transmission signal including at least one modulated signal to be output at a first angle; and generating a second transmission signal to be output at a second angle different from the first angle; and generating a second chirp chain at a second chirp rate for the transmission wave to be output including: generating a third transmission signal including at least one modulated signal to be output at the first angle; and generating a fourth transmission signal including at least one modulated signal to be output at the second angle, where the first chirp rate is different than the second chirp rate.

20 Claims, 13 Drawing Sheets

(56) References Cited

U.S. PATENT DOCUMENTS

| | | | |
|---|---|---|---|
| 11,719,803 B2* | 8/2023 | Zaidi | G01S 13/931 |
| | | | 342/70 |
| 2006/0262009 A1* | 11/2006 | Watanabe | G01S 7/36 |
| | | | 342/159 |
| 2009/0207079 A1* | 8/2009 | Samukawa | G01S 13/931 |
| | | | 342/438 |
| 2012/0235857 A1 | 9/2012 | Kim et al. | |
| 2014/0118184 A1* | 5/2014 | Minowa | G01S 13/589 |
| | | | 342/104 |
| 2019/0113602 A1* | 4/2019 | Matsumoto | G01S 13/584 |
| 2020/0353919 A1* | 11/2020 | Kawabata | G01S 15/93 |
| 2021/0003691 A1* | 1/2021 | Zaidi | G01S 7/35 |
| 2021/0293950 A1* | 9/2021 | Shams | H01Q 3/36 |
| 2021/0296764 A1* | 9/2021 | Shams | H01Q 3/385 |
| 2022/0308204 A1* | 9/2022 | Zaidi | G01S 13/426 |
| 2022/0393341 A1* | 12/2022 | Shams | H01Q 21/28 |
| 2024/0159887 A1* | 5/2024 | Zaidi | G01S 7/412 |

\* cited by examiner

RADAR DEVICE AND SIGNAL PROCESSING METHOD OF RADAR DEVICE

CROSS-REFERENCE TO RELATED APPLICATIONS

This application claims the benefit of U.S. Provisional Application No. 63/168,510, filed on Mar. 31, 2021. The entire disclosure of the application referenced above is incorporated herein by reference.

FIELD

The present disclosure relates to a radar device and more particularly to a signal method of a radar device.

BACKGROUND

This section provides background information related to the present disclosure which is not necessarily prior art.

U.S. Pub. No. 2019/0113602 A1 references a transmitting beam angle controllable radar device using a narrow beamwidth, as shown in FIG. 2 of that publication.

To decrease the detecting time, the transmitting signal at the first angle is decimated and other signals at the other angles are transmitted during the interval time of decimated time, as shown in the right side of FIG. 4 of that publication during Ttx2. This keeps the same speed resolution as the case without signal decimation.

However, the interval time lowers the maximum unambiguous speed by the ratio of decimation. To compensate this maximum unambiguous speed degradation, the application proposes using a combination of a short but continuous signal chain, as shown on the left side of FIG. 4 during Ttx1, with the decimated signal chain described above.

This patent publication also describes the example of only using decimated signal chain and not using a short but continuous signal, as shown in FIG. 13. However, compensation of maximum unambiguous speed is not performed. In addition, the detectable maximum unambiguous speed of the publication may be limited to the unit signal time length.

U.S. Pub. No. 2019/0113602, published on Apr. 18, 2019, is incorporated herein by reference in its entirety.

SUMMARY

In a feature, a radar device includes: a transmitter module configured to generate transmission waves based on transmission signals and to output a transmission wave at each of a plurality of predetermined angles; a receiver module configured to receive reflected waves of the transmission waves from a target and to generate reception signals based on the reflected waves; and a control module configured to determine information on the target based on the reception signals, wherein the information includes at least one of a speed of the target and a distance to the target, where the transmitter module is configured to generate the transmission waves including: generating a first chirp chain at a first chirp rate for a transmission wave to be output including: generating a first transmission signal including at least one modulated signal for the transmission wave to be output at a first angle at intervals of a predetermined idle running time; and generating a second transmission signal including at least one modulated signal for the transmission wave to be output at a second angle different from the first angle, in each interval of the idle running time; and generating a second chirp chain at a second chirp rate for the transmission wave to be output including: generating a third transmission signal including at least one modulated signal for the transmission wave to be output at the first angle at intervals of the predetermined idle running time; and generating a fourth transmission signal including at least one modulated signal for the transmission wave to be output at the second angle in each interval of the idle running time, where the first chirp rate is different than the second chirp rate.

In further features, the control module is configured to: acquire beat signals of the first chirp chain at the first angle; perform first and second Fast Fourier Transforms (FFTs) on the beat signals and generate a two dimensional power spectrum; extract a peak from the two dimensional power spectrum; and determine a first speed of the target based on the peak.

In further features, the control module is further configured to determine a distance to the target based on the peak.

In further features, the control module is further configured to: acquire second beat signals of the second chirp chain at the first angle; perform third and fourth FFTs on the second beat signals and generate a two dimensional power spectrum; extract a second peak from the second two dimensional power spectrum; and determine a second speed of the target based on the second peak.

In further features, the control module is further configured to determine a difference between the speed and the second speed of the target.

In further features, the control module is further configured to determine a compensation value based on the difference.

In further features, the control module is further configured to determine the speed of the target based on the compensation value and one of the first speed and the second speed.

In further features, the control module is configured to set the speed based on a sum of (a) the compensation value and (b) the one of the first speed and the second speed.

In further features, an electronic control module is configured to selectively actuate an actuator based on the information on the target.

In further features, the electronic control module is configured to selectively one of accelerate and decelerate a vehicle based on the information on the target.

In further features, the first chirp chain has a first chirp slope at the first angle and the first chirp chain has a second chirp slope at a second angle different than the first angle, where the second chirp slope is different than the first chirp slope.

In further features, the first chirp chain has a first chirp slope at the first angle and the second chirp chain has a second chirp slope at the first angle, where the second chirp slope is the same as the first chirp slope.

In a feature, a method includes: generating transmission waves based on transmission signals and outputting a transmission wave at each of a plurality of predetermined angles; receiving reflected waves of the transmission waves from a target and generating reception signals based on the reflected waves; and determining information on the target based on the reception signals, where the information includes at least one of a speed of the target and a distance to the target, and where the generating the transmission waves includes: generating a first chirp chain at a first chirp rate for a transmission wave to be output including: generating a first transmission signal including at least one modulated signal for the transmission wave to be output at a first angle at intervals of a predetermined idle running time; and generating a second transmission signal including at least one modulated signal for the transmission wave to be output at a second angle different from the first angle, in each interval of the idle running time; and generating a second chirp chain at a second chirp rate for the transmission wave to be output including: generating a third transmission signal including at least one modulated signal for the transmission wave to be output at the first angle at intervals of the predetermined idle running time; and generating a fourth transmission signal including at least one modulated signal for the transmission wave to be output at the second angle in each interval of the idle running time; and where the first chirp rate is different than the second chirp rate.

In further features, the method further includes: acquiring beat signals of the first chirp chain at the first angle; performing first and second Fast Fourier Transforms (FFTs) on the beat signals and generating a two dimensional power spectrum; extracting a peak from the two dimensional power spectrum; and determining a first speed of the target based on the peak.

In further features, the method further includes determining a distance to the target based on the peak.

In further features, the method further includes: acquiring second beat signals of the second chirp chain at the first angle; performing third and fourth FFTs on the second beat signals and generate a two dimensional power spectrum; extracting a second peak from the second two dimensional power spectrum; and determining a second speed of the target based on the second peak.

In further features, the method further includes determining a difference between the speed and the second speed of the target.

In further features, the method further includes determining to determine a compensation value based on the difference.

In further features, the method further includes determining the speed of the target based on the compensation value and one of the first speed and the second speed.

In further features, the method further includes setting the speed based on a sum of (a) the compensation value and (b) the one of the first speed and the second speed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Example embodiments will now be described more fully with reference to the accompanying drawings.

To improve maximum detection distance, a method to increase signal power by using a narrow beamwidth for a radar device may be used. In order to widen the field of view (FoV) of the radar device, the radar device may steer a plurality of beams over the desired FoV. As a result, the radar device using a narrow beamwidth takes a longer time of detecting operation than the radar device using a wide beamwidth over the specific FoV. The detecting time, which may be kept as short as possible, can be decreased by shortening the time length of the modulated signal. However, this may degrade the speed resolution.

The present disclosure involves decreasing the detecting time without the speed resolution degradation and improving maximum unambiguous speed for a radar device using a narrow beamwidth.

As a method to shorten the detecting time for a radar device using a narrow beamwidth, this application involves use of two sets of decimated signal chains to estimate the compensated speed based on the difference between two measured speed results. This improves the detectable maximum unambiguous speed limitation by optimizing the time difference between two signal chains.

Described herein is a way to shorten the detecting time for a radar device using a narrow beamwidth without the performance degradation. The signal time length is related to the detecting time, and the speed resolution and maximum unambiguous speed may have a strong dependency of the signal time length. Described herein is an effective compensation system and method that fulfills both the detecting time and performance for a radar device using a narrow beamwidth.

Figure 1:
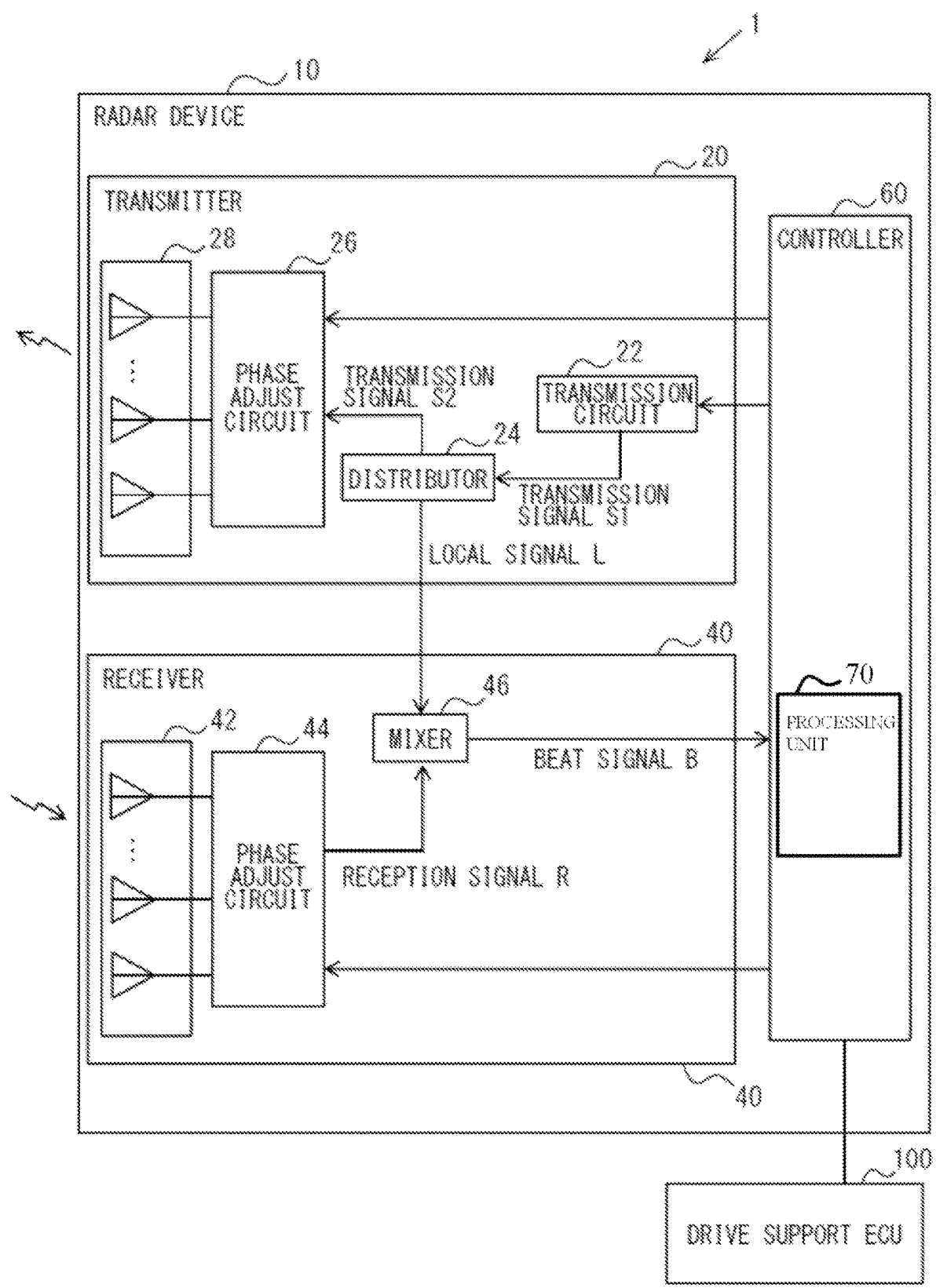
FIG. 1 is a functional block diagram of an example radar device.

With reference to FIG. 1, an in-vehicle system 1 (a system in a vehicle) includes the radar device 10 and a drive support ECU (electronic control unit) 100. Units may also be referred to as modules. For example, the electronic control unit may be referred to as an electronic control module.

The in-vehicle system 1 is mounted on a vehicle. The radar device (module) 10 includes a transmitter (module) 20 that transmits a transmission wave and a receiver (module) 40 that receives a transmission wave reflected by an object as a reception wave. Through signal processing at a controller (module) 60, the controller 60 detects a distance to a target, which is an object that reflects the transmission wave back to the radar device 10, a relative speed to the target, and an azimuth/direction of the target as target information. The radar device 10 outputs the detected target information.

The target information (distance, relative speed, azimuth/direction) output from the radar device 10 is input to the drive support ECU 100 via an in-vehicle network such as a CAN (Controller Area Network) or an Ethernet network.

A phase adjust circuit (module) 26 may be combined with a transmission antenna array 28 (an array of one or more transmit antennas) to constitute a transmission phased array antenna. A phase adjust circuit (module) 44 may be combined with a reception antenna array 42 (an array of one or more receive antennas) to constitute a reception phased array antenna.

To set a desired transmission beam direction, following the signals from the controller 60, the phase adjust circuit 26 adjusts a phase shift amount of each transmission signal into the antenna element in the transmission antenna array 28. In the similar way, to set the desired receiver beam direction, following the signals from the controller 60, the phase adjust circuit 44 adjusts a phase shift amount of each reception signal into the antenna element in the antenna array 42.

Figure 2:
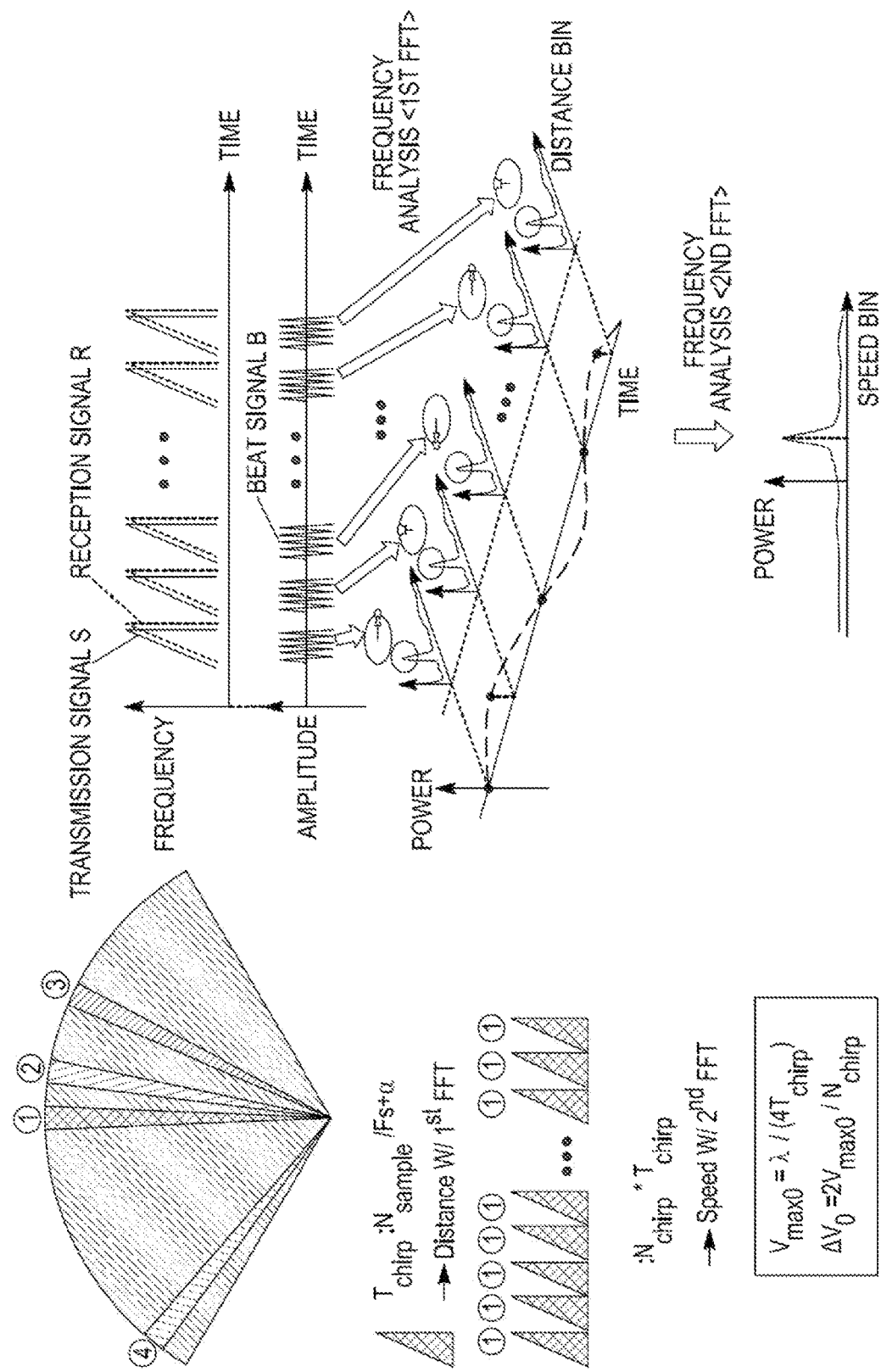
FIG. 2 is an example illustration of detection of distance and relative speed in a fast chirp modulation (FCM) scheme.

With reference to FIG. 2, the radar device 10 may be a fast chirp modulation (FCM)-type radar device. In the FCM scheme, the controller 60 determines a distance to a target from the frequency of a beat signal generated from the transmission and reception signals. The controller 60 determines the distance from the beat frequency (the frequency of the beat signal), such as by determining a first Fast Fourier Transform (FFT) of the beat signal.

In addition, in the FCM scheme, the controller 60 determines the relative speed of the target from a phase rotation of a frequency component continuously detected regarding the same target. The speed is calculated by the controller 60 based on the beat frequency by a 2nd FFT of each beat signal in the chirp chain, such as shown in FIG. 2. For example, the controller 60 may perform the second FFT on the signal resulting from the first FFT. The maximum unambiguous speed, $V_{max0}$, may be inversely proportional to the chirp time, $T_{chirp}$, and the speed resolution, $\Delta V0$, may be inversely proportional to the chirp number, $N_{chirp}$. To have a small speed resolution, long time length of the chirp chain may be useful for a beam direction.

Figure 3:
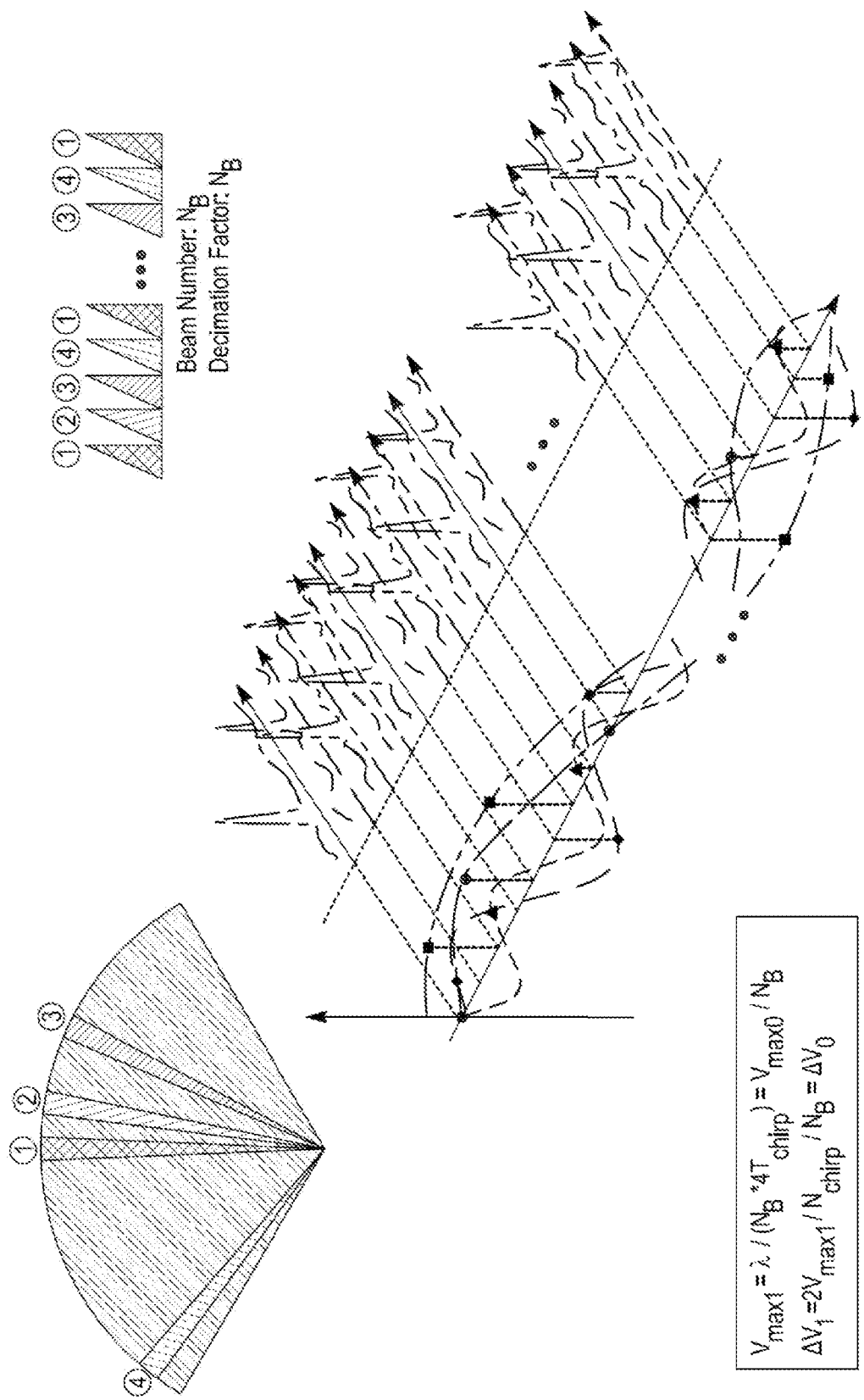
FIG. 3 is an example illustration of signal decimation and relation of relative speed to signal time length.

With reference to FIG. 3, to decrease the detection time over multiple beam directions while keeping the same speed resolution, the controller 60 decimates chirp numbers for a beam direction and other chirps at the other directions transmitted during the interval time of decimated time. Therefore, the equivalent detection time may decrease by a factor of decimation factor, NB. However, maximum unambiguous speed may also decrease by a factor of NB.

Figure 4:
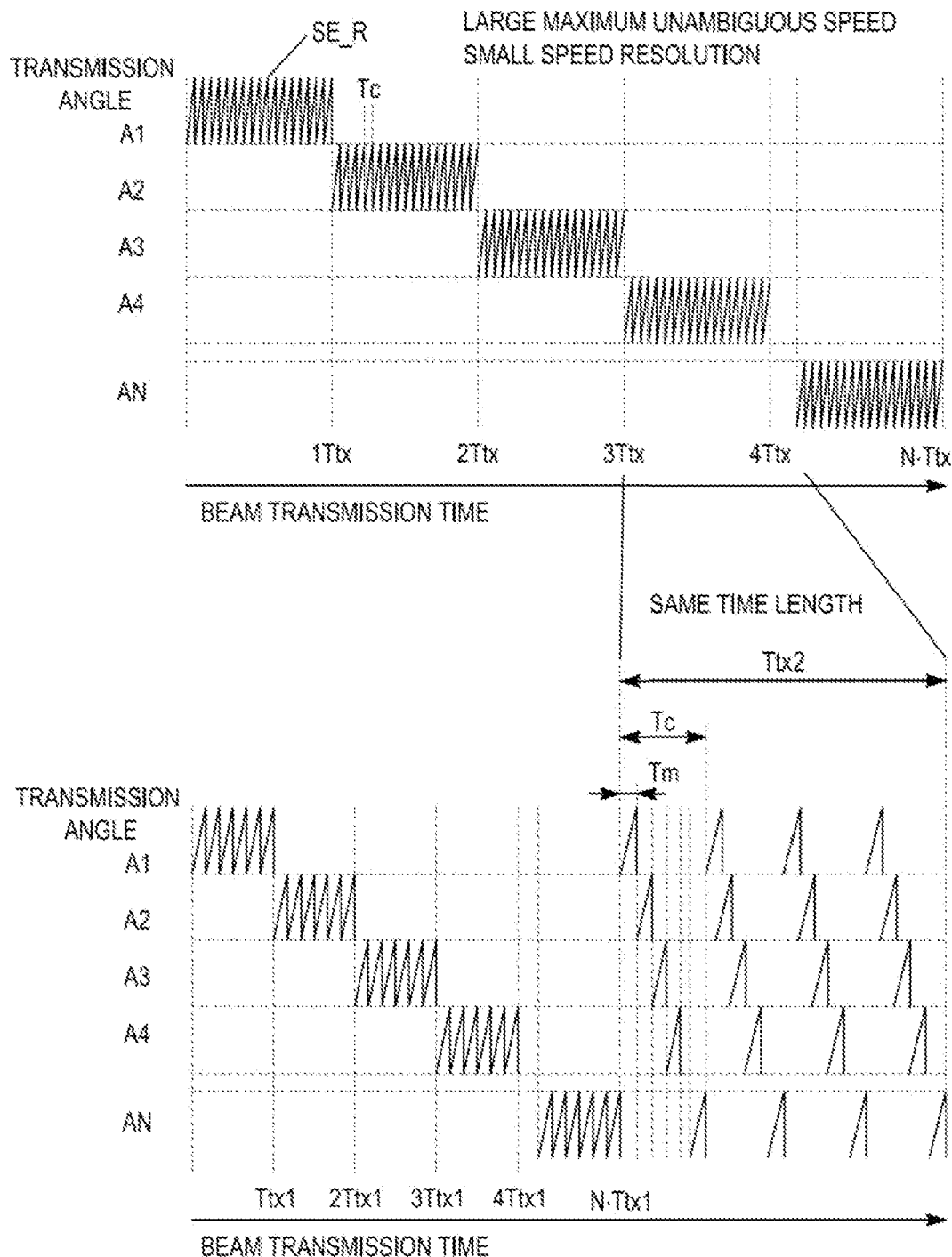
FIG. 4 includes a top graph including an example chirp chain and a bottom graph including an example chirp chain with decimation.
Figure 5:
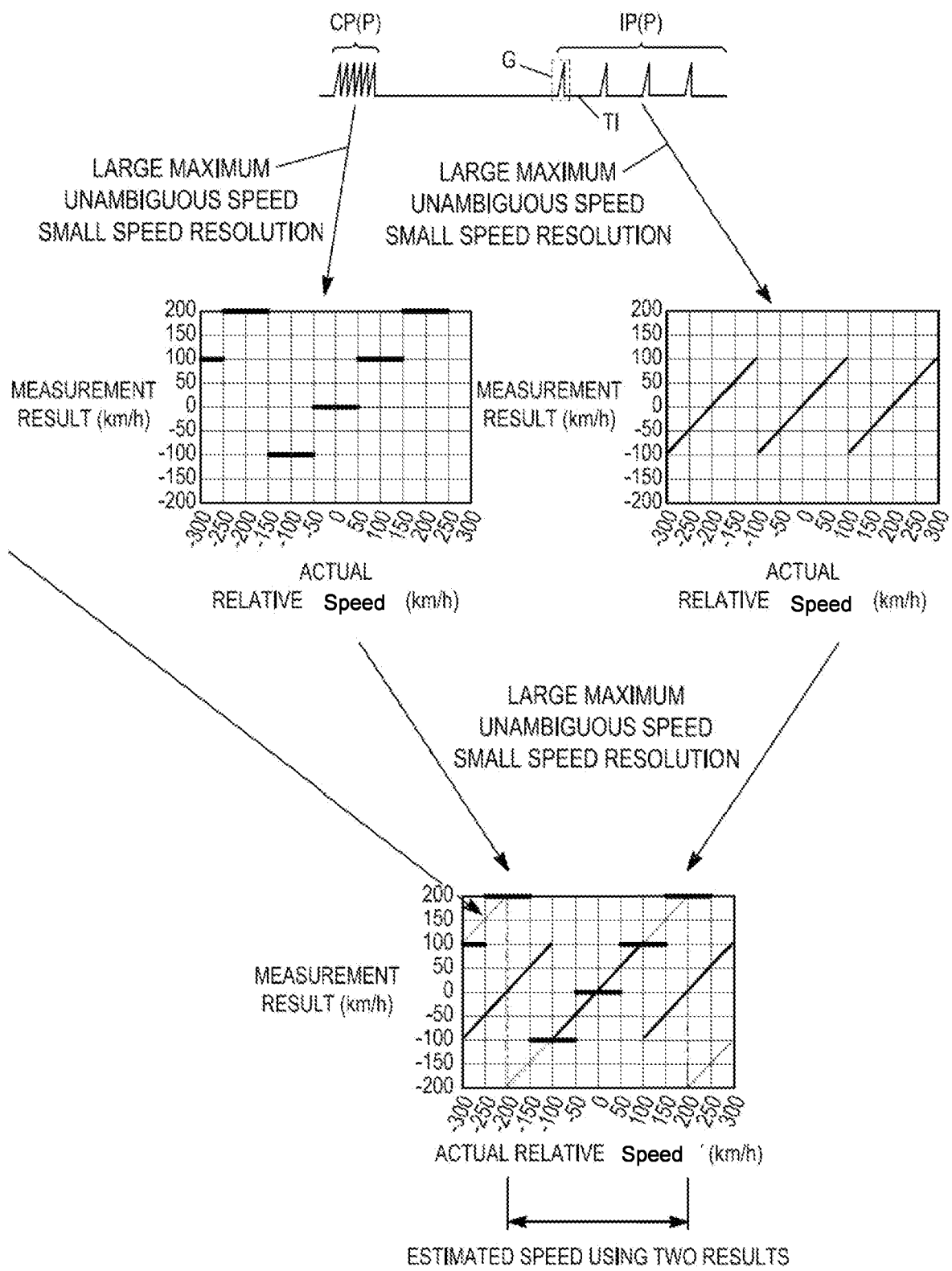
FIG. 5 includes example graphs of speed estimation.

The prior patent application decreases the detecting time from the radar device 10 using a chirp chain while having the same maximum unambiguous speed and speed resolution using two different types of chirp, such as shown in FIG. 4 and the following figures. One chirp can have a large maximum unambiguous speed but large speed resolution. Another chirp can have a small speed resolution but small maximum unambiguous speed. Combining two results shown in FIG. 5 may yield the same maximum unambiguous speed and speed resolution.

Figure 6:
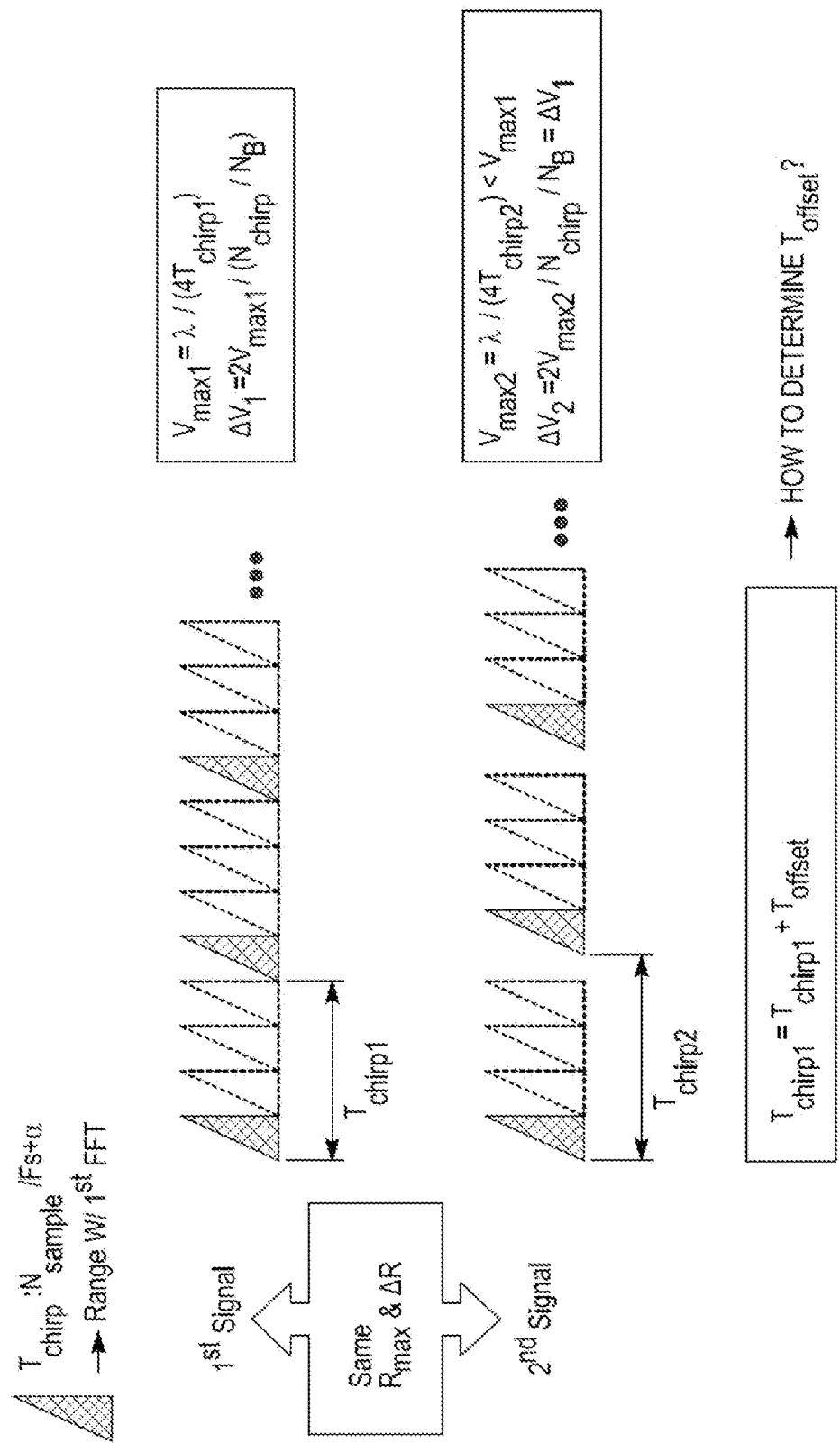
FIG. 6 includes an example illustration of two sets of decimated signal chains.

With reference to FIG. 6, the controller 60 uses two chirp chains, and both chirp chains are decimated. The chirp time of $2^{nd}$ signal, $T_{chirp2}$, may be longer than the chirp time of 1st signal, $T_{chip1}$, by amount of $T_{offset}$, as shown in FIG. 6. This results in two different maximum unambiguous speeds of the target, $V_{max1}$ and $V_{max2}$, and also two different speed resolutions of $\Delta V1$ and $\Delta V2$. The slope and chirp time of unit chirp between two chirp chains may be set to the same values to have equivalent maximum detection distance and distance resolution.

Figure 7:
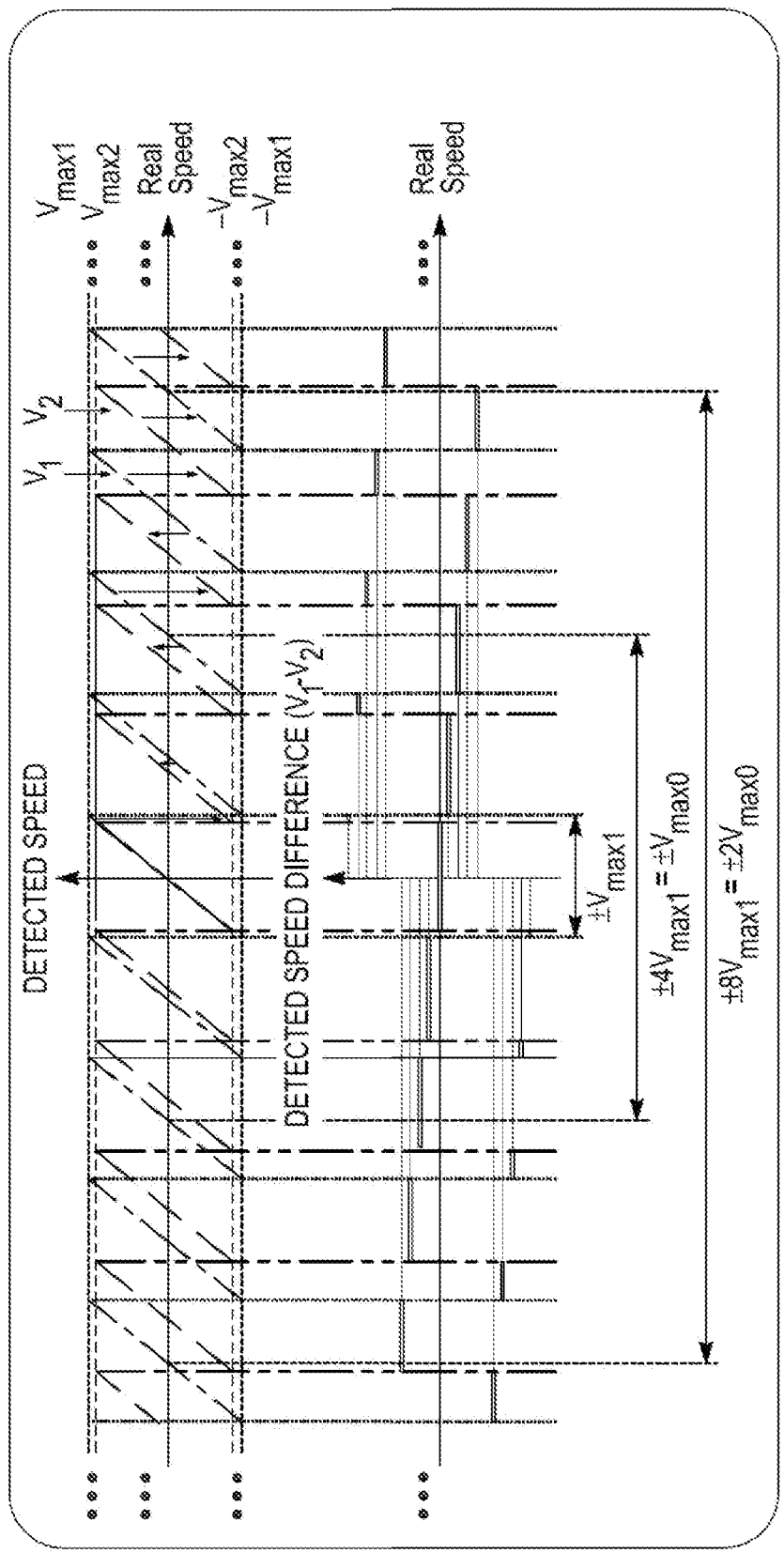
FIG. 7 includes an example graph of maximum unambiguous speed compensation.
Figure 8A:
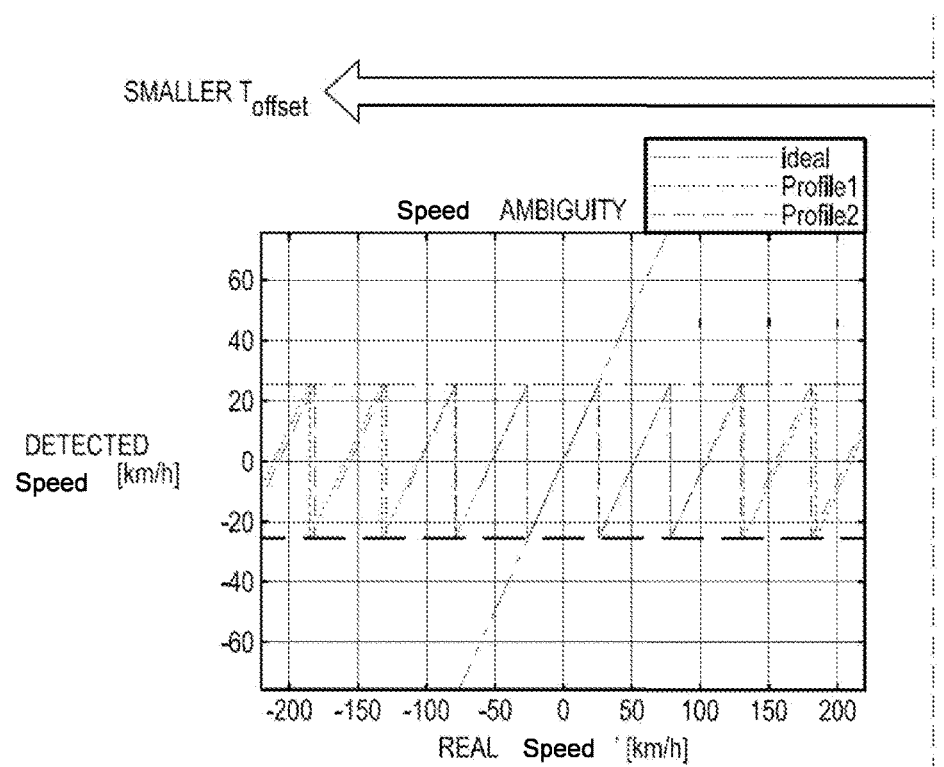
FIGS. 8A-8F include example graphs of offset (T offset) optimization.
Figure 8B:
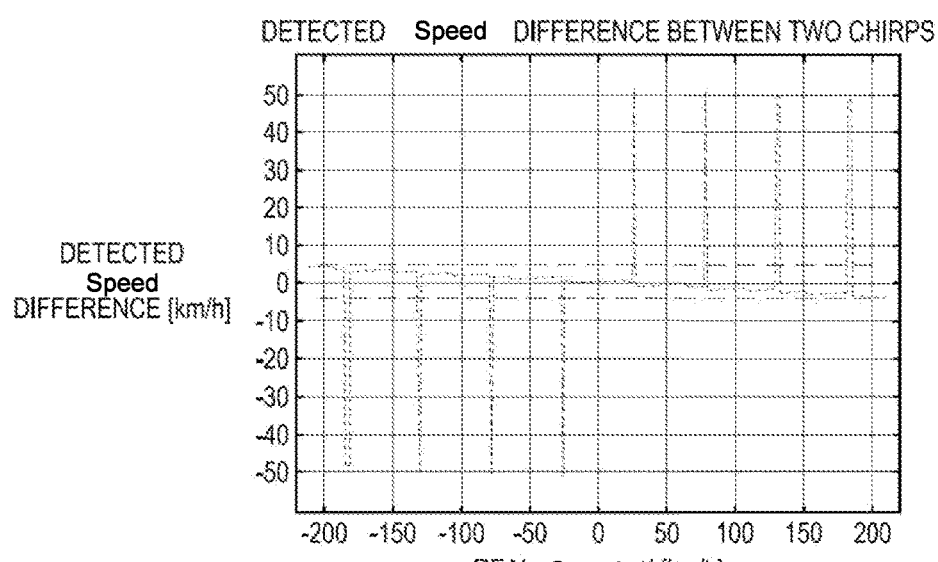
Figure 8C:
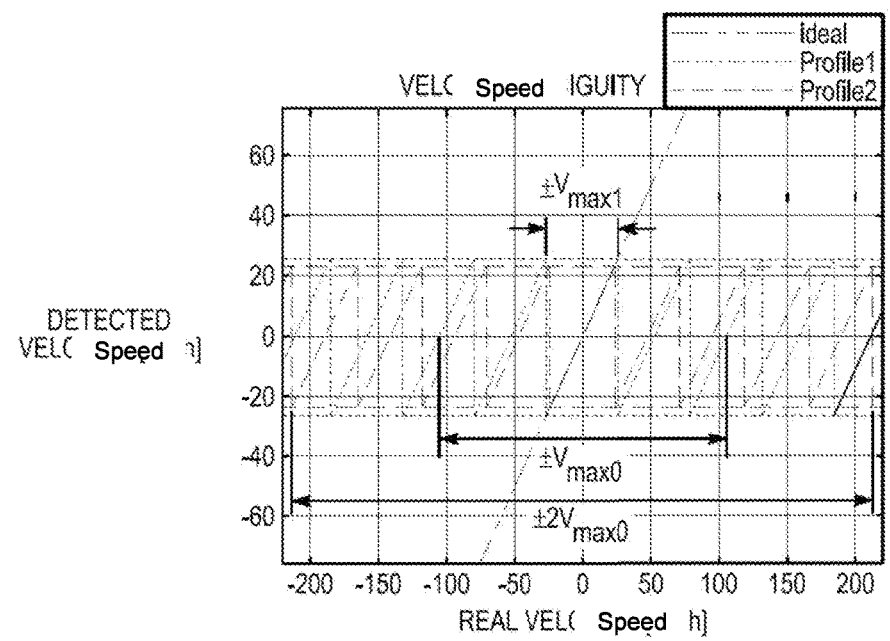
Figure 8D:
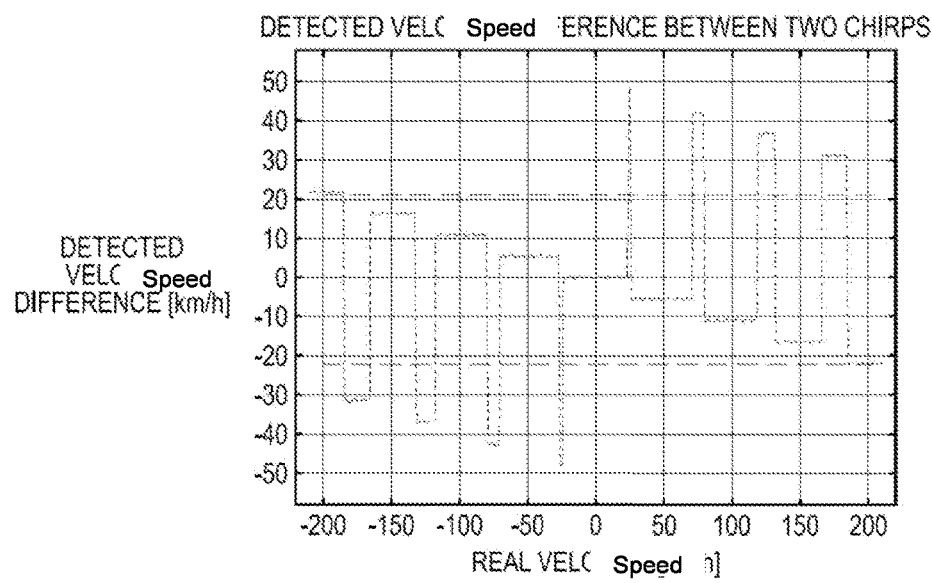
Figure 8E:
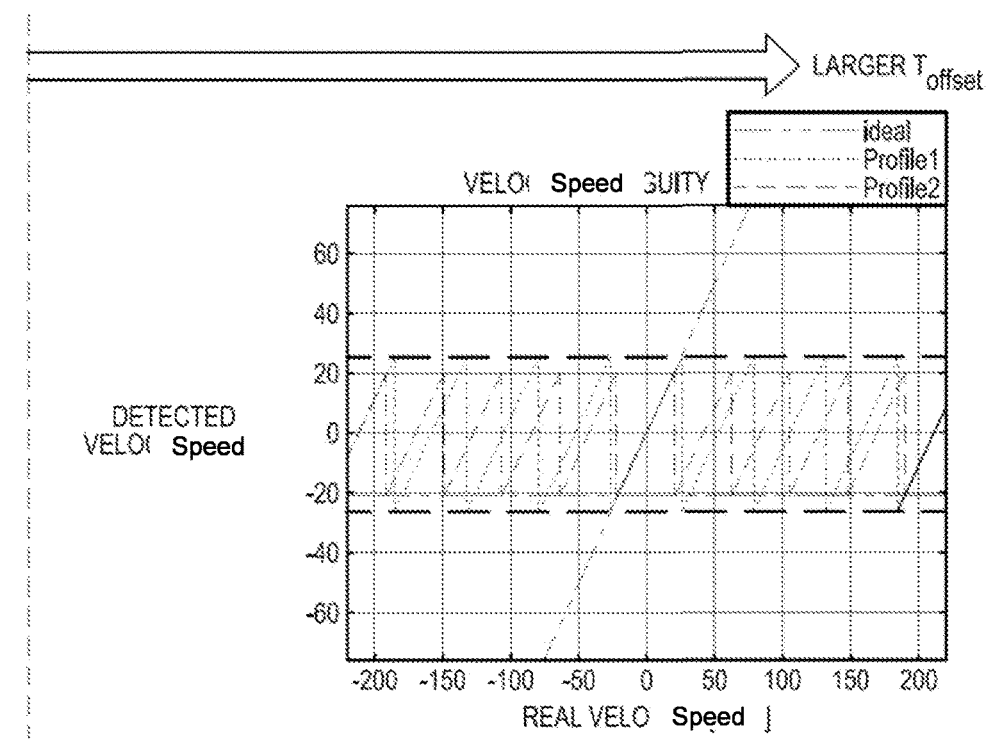
Figure 8F:
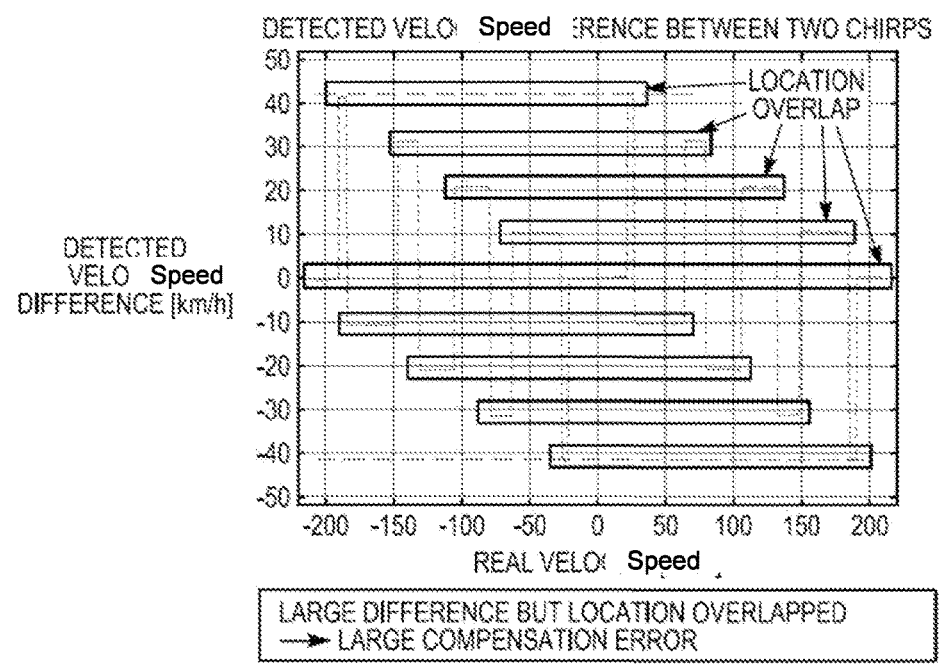

With reference to FIG. 7, the ambiguity fold of detected speed may happen at an integer multiple of $V_{max1}$ and $V_{max2}$ over real speed, such as shown in the top graph of FIG. 7. The detected speed difference between two speeds V1 and V2 may be a constant value in each folded location/range on the real speed axis (x-axis). The compensation value is determined by the controller 60 based on the folded location. Then, the real speed can be estimated by adding the compensation value to a detected speed, which is V1 or V2.

The advantage of this is that larger maximum unambiguous speeds, for example, $\pm 2V_{max0}$, can be estimated than the maximum unambiguous speed, which is $\pm V_{max0}$, determined by the chirp time of unit chirp.

With reference to FIGS. 8A-8F, selecting the $T_{offset}$ which is difference between $T_{chirp1}$ and $T_{chirp2}$ is done to distinguish folded location correctly. The $T_{offset}$ increases moving from FIG. 8A/B to FIG. 8E/F. The smaller $T_{offset}$ is, the larger the detection location error between the detected speed difference may be due to the small differences while there is no location overlap. The larger $T_{offset}$ is, the larger the detection location error between the detected speed difference may be due to the location overlaps while the differences are large.

In this example, the decimation rate is four. The maximum unambiguous speed decreases by the factor of four and it is $V_{max1}$. The maximum unambiguous speed can be improved to $8V_{max1}$ which is two times of the maximum unambiguous speed that can be estimated by the U.S. publication discussed above.

Figure 9:
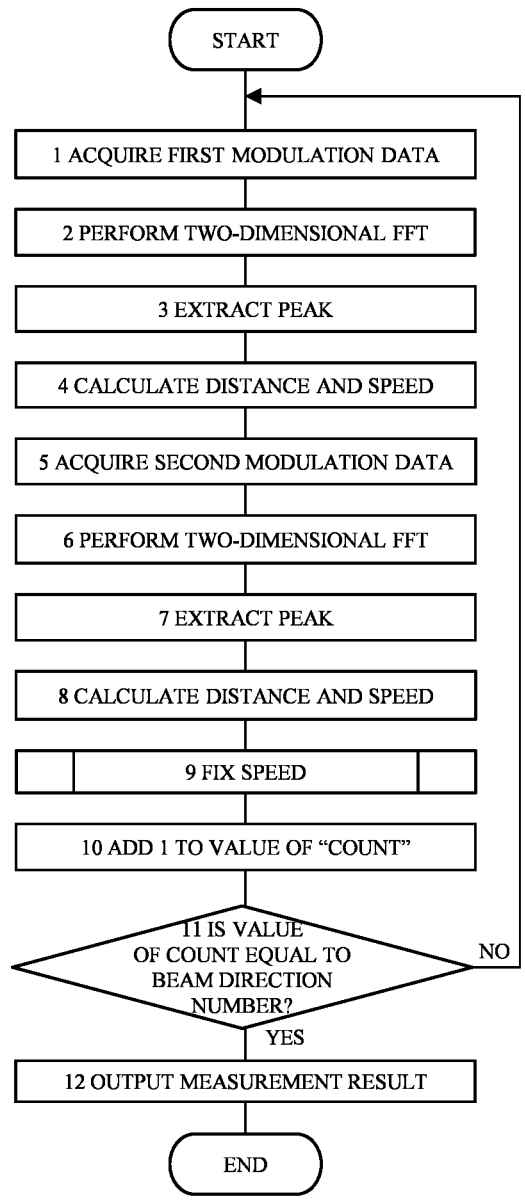
FIG. 9 is a flowchart depicting an example method of target detection and speed estimation.

With reference to FIG. 9, a flowchart depicting an example method of target detection performed by the processing unit 70 in the controller 60 is shown.

When the present process is started, at 1, the controller 60 acquires the first modulation data (that is, the beat signals of the FCM).

At 2, the controller 60 performs two-dimensional FFT processing of the first modulation data. Specifically, as shown in FIG. 2, the controller 60 performs a first FFT process on the first modulation data and generates a power spectrum for each chirp. Next, the controller 60 collects the processing results of all chirps for each frequency bin, and performs a second FFT process on the results. Then, based the results of the first and second FFT processes, a two-dimensional power spectrum is determined by the controller 60.

At 3, the controller 60 extracts a peak from the two-dimensional power spectrum.

At 4, the controller 60 calculates the distance and speed of the extracted peak.

From 5 to 8 the same process as from 1 to 4 is repeated by the controller except the data processed is the second modulation data.

At 9, the controller 60 calculates the difference between two calculated speeds from 4 and 8. The speed difference is a constant value in each folded location. The compensation value is determined by the controller 60 based on the folded location. Then, the real speed of the target can be estimated by the controller 60 based on a sum (addition) the compensation value to a calculated speed at 4 or 8.

At 10, the controller 60 adds 1 to the value of "COUNT" which is the counter value of beam direction number. The "COUNT" is set to 0 initially when control starts.

At 11, in the case where the value of "COUNT" is not equal to a predetermined beam direction number ("NO"), control returns to 1 and repeats 1 to 11 for another beam direction. In the case of "YES" which means the measurements over each beam direction are finished, the control proceeds to the 12.

At 12, the controller 60 outputs the measurement results of the distance and compensated speed over the whole beam directions to the ECU 100. One or more actions may be taken by the ECU 100 based on the distance and/or compensated speed. For example, based on the distance and/or the compensated speed, the ECU 100 may adjust (e.g., increase or decrease) torque output of a torque producing device (e.g., an engine or an electric motor), the ECU 100 may adjust application of mechanical brakes, the ECU 100 may adjust steering (e.g., left or right), etc.

Figure 10:
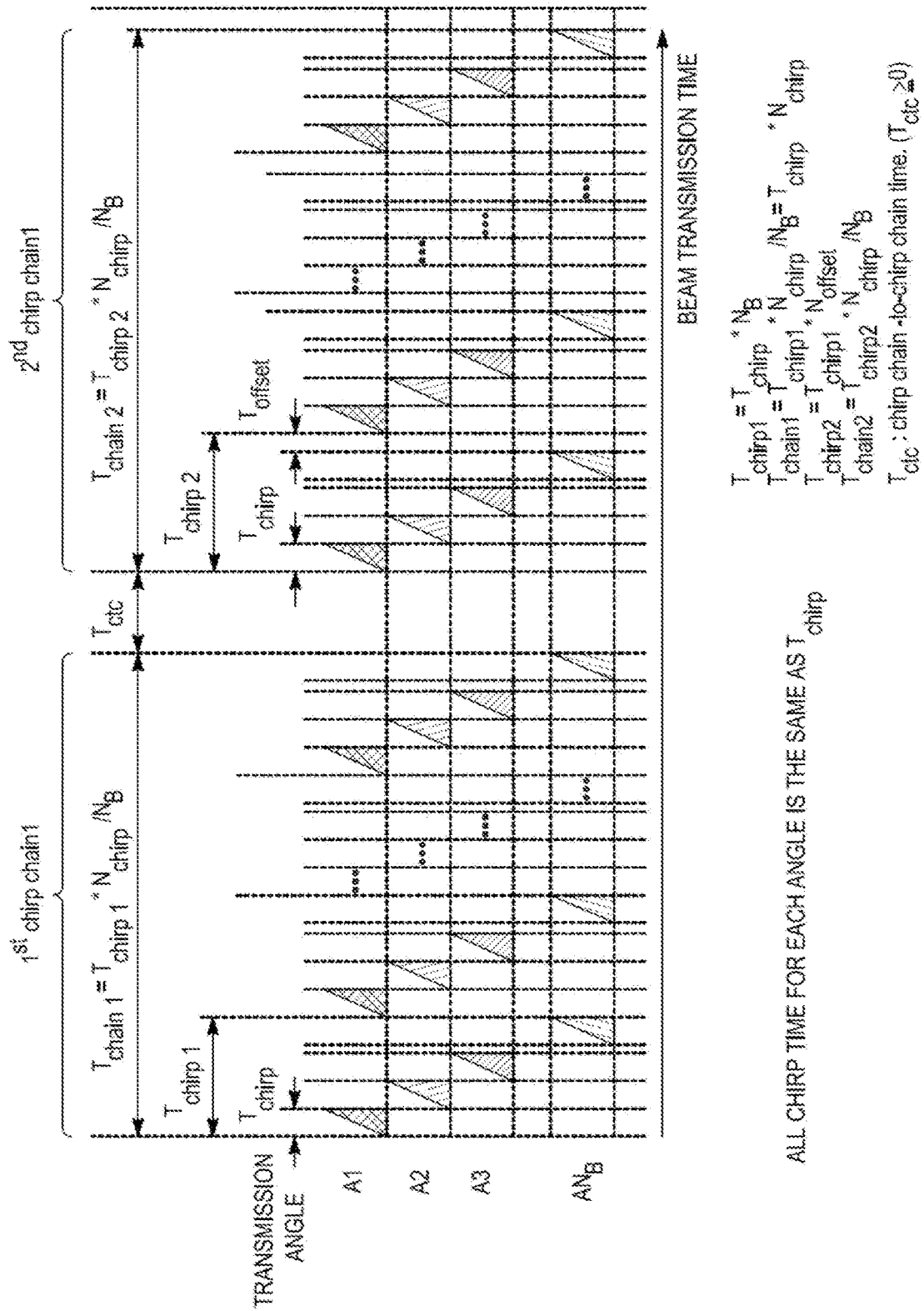
FIG. 10 includes an example graph of chirp chains over time.

FIG. 10 includes an example graph of first and second chirp chains at different transmission angles (A1, A2, . . . $A_N$). In this example, each chirp (triangle) has the same chirp slope. The first chirp chain has a first chirp rate, and the second chirp chain has a second chirp rate that is different than the first chirp rate.

Figure 11:
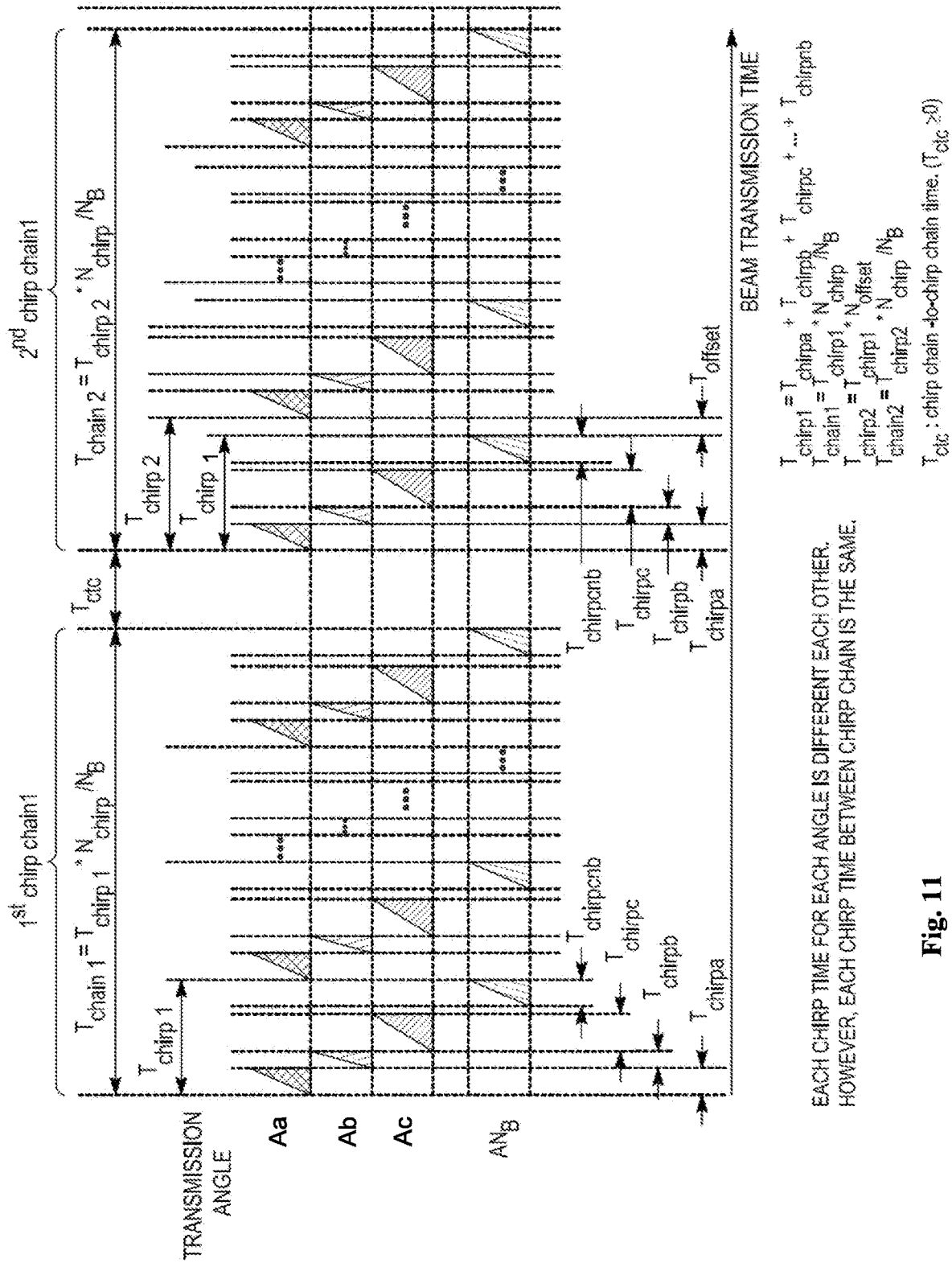
FIG. 11 includes an example graph of chirp chains with different chirp slopes.

FIG. 11 includes an example graph of first and second chirp chains at different transmission angles (Aa, Ab, . . . $A_N$). In this example, the chirps (triangle) of different angles have different chirp slopes (the slope of the leading edge of the triangle). For example, the chirps of the angle Aa have a different slope than the chirps of angle Ab. The first chirp chain has a first chirp rate, and the second chirp chain has a second chirp rate that is different than the first chirp rate. Chirp rate may refer to the period between consecutive starts of chirps at an angle of a chirp chain. In other words, the periods between starts of consecutive chirps of a chirp chain at a transmission angle may be the same.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

As used herein, the phrase at least one of A, B, and C should be construed to mean a logical (A OR B OR C), using a non-exclusive logical OR. For example, the phrase at least one of A, B, and C should be construed to include any one of: (i) A alone; (ii) B alone; (iii) C alone; (iv) A and B together; (v) A and C together; (vi) B and C together; (vii) A, B, and C together. The phrase at least one of A, B, and C should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "unit" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A radar device comprising:
   a transmitter module configured to generate transmission waves based on transmission signals and to output a transmission wave at each of a plurality of predetermined angles;
   a receiver module configured to receive reflected waves of the transmission waves from a target and to generate reception signals based on the reflected waves; and
   a control module configured to determine information on the target based on the reception signals, wherein the information includes at least one of a speed of the target and a distance to the target,
   wherein the transmitter module is configured to generate the transmission waves including:
      generating a first chirp chain at a first chirp rate for a transmission wave to be output including:
         generating a first transmission signal including at least one modulated signal for the transmission wave to be output at a first angle at intervals of a predetermined idle running time; and
         generating a second transmission signal including at least one modulated signal for the transmission wave to be output at a second angle different from the first angle, in each interval of the idle running time;
         wherein the first chirp chain repeats immediately with no time offset; and
      generating a second chirp chain at a second chirp rate for the transmission wave to be output including:
         generating a third transmission signal including at least one modulated signal for the transmission wave to be output at the first angle at intervals of the predetermined idle running time; and
         generating a fourth transmission signal including at least one modulated signal for the transmission wave to be output at the second angle in each interval of the idle running time,
         wherein the second chirp chain repeats with a time offset;
   wherein the first chirp rate is different than the second chirp rate.

2. The radar device of claim 1 wherein the control module is configured to:
   acquire beat signals of the first chirp chain at the first angle;

perform first and second Fast Fourier Transforms (FFTs) on the beat signals and generate a two dimensional power spectrum;

extract a peak from the two dimensional power spectrum; and determine a first speed of the target based on the peak.

3. The radar device of claim 2 wherein the control module is further configured to determine a distance to the target based on the peak.

4. The radar device of claim 2 wherein the control module is further configured to:

acquire second beat signals of the second chirp chain at the first angle;

perform third and fourth FFTs on the second beat signals and generate a two dimensional power spectrum;

extract a second peak from the second two dimensional power spectrum; and determine a second speed of the target based on the second peak.

5. The radar device of claim 4 wherein the control module is further configured to determine a difference between the speed and the second speed of the target.

6. The radar device of claim 5 wherein the control module is further configured to determine a compensation value based on the difference.

7. The radar device of claim 6 wherein the control module is further configured to determine the speed of the target based on the compensation value and one of the first speed and the second speed.

8. The radar device of claim 7 wherein the control module is configured to set the speed based on a sum of (a) the compensation value and (b) the one of the first speed and the second speed.

9. The radar device of claim 1 further comprising an electronic control module configured to selectively actuate an actuator based on the information on the target.

10. The radar device of claim 9 wherein the electronic control module is configured to selectively one of accelerate and decelerate a vehicle based on the information on the target.

11. The radar device of claim 1 wherein the first chirp chain has a first chirp slope at the first angle and the second chirp chain has a second chirp slope at a second angle different than the first angle, wherein the second chirp slope is different than the first chirp slope.

12. The radar device of claim 1 wherein the first chirp chain has a first chirp slope at the first angle and the second chirp chain has a second chirp slope at the first angle, wherein the second chirp slope is the same as the first chirp slope.

13. A method comprising:

generating transmission waves based on transmission signals and outputting a transmission wave at each of a plurality of predetermined angles;

receiving reflected waves of the transmission waves from a target and generating reception signals based on the reflected waves; and determining information on the target based on the reception signals, wherein the information includes at least one of a speed of the target and a distance to the target, and wherein the generating the transmission waves includes:

generating a first chirp chain at a first chirp rate for a transmission wave to be output including:

generating a first transmission signal including at least one modulated signal for the transmission wave to be output at a first angle at intervals of a predetermined idle running time; and generating a second transmission signal including at least one modulated signal for the transmission wave to be output at a second angle different from the first angle, in each interval of the idle running time, wherein the first chirp chain repeats immediately with no time offset; and generating a second chirp chain at a second chirp rate for the transmission wave to be output including:

generating a third transmission signal including at least one modulated signal for the transmission wave to be output at the first angle at intervals of the predetermined idle running time; and generating a fourth transmission signal including at least one modulated signal for the transmission wave to be output at the second angle in each interval of the idle running time; and wherein the second chirp chain repeats with a time offset;

wherein the first chirp rate is different than the second chirp rate.

14. The method of claim 13 wherein further comprising:

acquiring beat signals of the first chirp chain at the first angle;

performing first and second Fast Fourier Transforms (FFTs) on the beat signals and generating a two dimensional power spectrum;

extracting a peak from the two dimensional power spectrum; and determining a first speed of the target based on the peak.

15. The method of claim 14 further comprising determining a distance to the target based on the peak.

16. The method of claim 14 further comprising:

acquiring second beat signals of the second chirp chain at the first angle;

performing third and fourth FFTs on the second beat signals and generate a two dimensional power spectrum;

extracting a second peak from the second two dimensional power spectrum; and determining a second speed of the target based on the second peak.

17. The method of claim 16 further comprising determining a difference between the speed and the second speed of the target.

18. The method of claim 17 further comprising determining to determine a compensation value based on the difference.

19. The method of claim 18 further comprising determining the speed of the target based on the compensation value and one of the first speed and the second speed.

20. The method of claim 19 further comprising setting the speed based on a sum of (a) the compensation value and (b) the one of the first speed and the second speed.

* * * * *